United States Patent [19]

Cornelissens et al.

[11] 4,000,127
[45] Dec. 28, 1976

[54] CARBOXYMETHYLATED DERIVATIVES OF POLYSACCHARIDE AND DETERGENT COMPOSITIONS CONTAINING SAME

[75] Inventors: Emery G. P. Cornelissens, Den Haag; Jan J. H. Ploumen, Rotterdam, both of Netherlands

[73] Assignee: Akzo N.V., Arnhem, Netherlands

[22] Filed: Dec. 21, 1973

[21] Appl. No.: 427,211

Related U.S. Application Data

[63] Continuation-in-part of Ser. No. 228,758, Feb. 23, 1972, abandoned.

[30] Foreign Application Priority Data

Feb. 25, 1971 Netherlands .................. 7102556

[52] U.S. Cl. .......................... 536/102; 252/89 R; 252/109; 252/135; 252/180; 252/540; 252/DIG. 11; 260/209.5; 260/209.6; 260/231 CM; 536/36; 536/2; 536/3

[51] Int. Cl.² ................. C08B 11/02; C08B 31/10; C08B 37/04; C08B 37/06

[58] Field of Search ............ 260/233.3 R, 231 CM, 260/209.5, 209.6

[56] References Cited

UNITED STATES PATENTS

| | | | |
|---|---|---|---|
| 2,894,945 | 7/1959 | Hofreiter et al. | 260/233.3 R |
| 3,634,392 | 1/1972 | Lyness et al. | 260/209 R |
| 3,723,322 | 3/1973 | Diehl | 252/89 |
| 3,776,692 | 12/1973 | Franklin et al. | 260/231 A |
| 3,873,614 | 3/1975 | Lamberti et al. | 260/233.3 R |

FOREIGN PATENTS OR APPLICATIONS

| | | | |
|---|---|---|---|
| 7,002,499 | 8/1970 | Netherlands | 260/233.3 R |
| 7,002,500 | 8/1970 | Netherlands | 260/233.3 R |
| 717,901 | 11/1954 | United Kingdom | 260/233.3 R |

*Primary Examiner*—Ronald W. Griffin
*Attorney, Agent, or Firm*—Stevens, Davis, Miller & Mosher

[57] ABSTRACT

Carboxymethylated derivatives of polysaccharide compounds such as starch are disclosed which have improved sequestering properties and are useful as water softeners as well as detergency builders in detergent compositions. The compounds are water-soluble and have from 0.5 to 3 hydrogen atoms of the hydroxyl groups per monomeric six carbon glucose unit entirely or partially substituted with at least 2 neutralized or non-neutralized carboxyl groups.

Built detergent compositions containing the water-soluble carboxymethylated derivatives of polysaccharide compounds with organic water soluble surfactants are also disclosed. The compositions exhibit improved sequestering power.

5 Claims, No Drawings

CARBOXYMETHYLATED DERIVATIVES OF POLYSACCHARIDE AND DETERGENT COMPOSITIONS CONTAINING SAME

This application is a continuation-in-part of copending application Ser. No. 228,758, filed Feb. 23, 1972 now abandoned.

The invention relates to carboxymethylated derivatives of polysaccharide compounds which have improved sequestering properties and are useful as water softeners. They are also useful as detergency builders in detergent compositions.

Carboxymethylated derivatives of polysaccharide compounds are generally known, inter alia from the Dutch, Patent Specification No. 70-02500.

It has now been found that carboxymethylated polysaccharides of the character described infra have sequestering properties with an even higher performance for the same degree of substitution than the hitherto known carboxylated polysaccharides. The compounds of the present invention are novel and belong to the group of water-soluble carboxylated polysaccharides wherein from 0.5 to 3 hydrogen atoms of the hydroxyl groups per monomeric six carbon glucose unit are entirely or partially substituted with radicals containing 2 or more neutralized or non-neutralized carboxyl groups. Although the degree of substitution (D.S.) can be from 0.5 to 3.0, it is preferred that the degree of substitution should exceed about 1.3. The maximum, in any event, is three for the monomeric six carbon glucose unit.

In practicing this invention, the present carboxylated polysaccharides are normally only employed in the neutralized state, in the form of water-soluble salts wherein the cation may be any water-soluble cation which does not interfere with any other ingredients present. Preferred cations are alkali metals such as sodium, potassium and lithium; ammonium; substituted ammonium such as mono-, di-, and tri-methanol, ethanol, and propanol ammonium cations; as well as amine and similar alkanol derivatives.

As far as the polysaccharide is concerned, starch, cellulose, alginic acid and pectic acid may be used. The degree of polymerization of the polysaccharide used is governed by the final condition that the derivatives prepared therefrom must be watersoluble in the usual sense for sequestering agents. It is preferred that the polymerization degree of the final product should be greater than 3 and the most favorable results are obtained if this degree is in the range of 20 to 30,000.

As to the groups that are molecularly bound to the polysaccharide it should be noted that the groups used contain not more than one carboxyl group, or else the polysaccharide rings are broken open by oxidation.

Though the known carboxylated polysaccharides are capable of sequestering ions which cause water hardness, their capability does not approach the sequestering power of the known phosphates used for this purpose, even if the degree of substitution of the polysaccharide is relatively high, i.e. far above 1.5.

The carboxylated polysaccharides of the present invention have remarkably improved sequestering properties which may be compared with those of the phosphates used to date. However, the carboxymethylated derivatives of polysaccharide do not give rise to eutrophication or pollution of waste water, because they are biodegradable.

It is believed that the good performance of the present polysaccharides is due to the relative positions of the carboxyl groups. For instance, calcium ions will be complexed when two carboxyl groups react with one calcium ion.

According to the mass action theory, the reaction will proceed more rapidly when the carboxyl groups are attached to the same molecule. The known carboxylated polysaccharides have their carboxyl groups randomly displaced on the material, whereas the present invention provides polysaccharides with carboxyl groups so placed that the complexing calcium ion chelates can be easily produced.

The carboxylated polysaccharides of the present invention may be prepared by reacting polysaccharides in an alkaline medium with a halogen derivative of a polycarboxylic acid or the alkali salt thereof, the preparation being carried out by the known method used for cellulose ethers and starch ethers.

As polysaccharides according to the invention whose derivatives are useable may be mentioned: cellulose, starch, alginic acid and pectic acid, with the most favorable results being obtained if the polysaccharide part of the compounds is starch.

Halogen derivatives of polycarboxylic acids suitable for reaction with the polysaccharides are first of all derivatives of dibasic acids, especially bromine or chlorine derivatives.

Examples of dibasic acids are malonic acid, maleic acid, fumaric acid, succinic acid, glutaric acid, adipic acid, and homologs thereof. After substitution of halogen, more particularly bromine or chlorine, for one of the hydrogen atoms of a methylene group, these compounds may be reacted with the polysaccharide in the aforementioned manner.

Rather than teaching the polysaccharide with the halogen derivatives of the aforementioned dicarboxylic acids, use may be made of the halogen derivatives of dibasic hydroxy-acids, such as apple acid, also known as malic acid.

Of the aforementioned acids for reaction with the polysaccharide have first of all been found suitable the halogen derivatives of the acids with a short carbon chain linking the carboxyl groups. It is therefore preferred that for the preparation of the carboxylated polysaccharide use should be made of α-halogen malonic acid, the halogen preferably being bromine or chlorine.

Apart from the substituent —CH(COO—)2 derived from malonic acid and the hydroxylated substituent

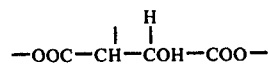

derived from apple acid, differently substituted acids may be used. The carboxylic acid may be substituted with a substituent of an aliphatic or an aromatic nature and the acid may be coupled to the polysaccharide molecule through the substituent. It is also possible to prepare the carboxylated polysaccharides of the invention by using an organic acid with three or more carboxyl groups. An example of such an acid is α-carboxy glutaric acid. In this case the carboxylated polysaccharide has a substituent group

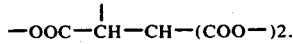
$$-OOC-CH-CH-(COO-)_2.$$

The polysaccharide derivatives of this invention possess a useful sequestering property which make them valuable for treating aqueous solutions containing polyvalent metal ions (calcium, magnesium, iron, etc.) by adding to a solution an effective amount of one of the present compounds, or a mixture thereof. They are also valuable when used with polysaccharide derivatives which contain substituents with only one carboxyl group. Alternatively, these or other substituents may be contained in the polysaccharide derivatives according to the invention. The amount employed ranges from 0.25 parts per million to 10,000 parts per million of the aqueous solution.

The useful sequestering properties of the compounds of the present invention may be illustrated by means of the following Table I. In this Table the amount of some carboxymethylated polysaccharides of this invention with different degree of substitution is compared with the amount of sodium tripolyphosphate (STP) to reduce a water with a hardness of 15° dH to 0.1° dH (German hardness). With sodium citrate, often cited as a good sequestering agent, only a residual hardness of 0.4° dH could be obtained.

TABLE I

| Sequestrant (sodium salts) | | Starch substituted with α-bromomalonic acid | | | | | | |
|---|---|---|---|---|---|---|---|---|
| Degree of substitution | STP | 0.73 | 1.3 | 1.5 | 1.6 | 1.8 | 2.0 | 2.35 |
| g/l added to obtain a residual hardness of 0.1° dH. | 0.9 | 2.2 | 1.7 | 1.4 | 1.4 | 1.2 | 1.3 | 1.7 |

In addition to the compounds of the present invention having useful sequestering properties, they are also useful as detergency builders.

In practicing this builder embodiment, the compounds of this invention are used in conjunction with organic synthetic detergents to provide built laundering and detergent compositions. They may be used in various combinations with known sequestering agents such as sodium ethylene diamine tetra-acetate, sodium nitrilo tri-acetate, sodium polyacrylate, sodium polymaleate, etc.

Suitable surface detergents are, for example, the usual anionic, nonionic, zwitterionic, and ampholytic detergents.

It is preferred to use mixtures of ionic and non-ionic surface detergents.

The detergents which can be utilized in conjunction with the carboxylated polysaccharides of this invention are exemplified as follows:

1. Anionic synthetic non-soap detergents can be broadly described as the water-soluble salts, particularly the alkali metal salts, of organic sulfuric reaction products having in their molecular structure an alkyl radical containing from about 8 to about 22 carbon atoms and a radical selected from the group consisting of sulfonic acid and sulfuric acid ester radicals. As examples of such synthetic detergents may be mentioned, the alkali metal salts of alkyl sulfates or alkylbenzenesulfonates, glycerylsulfate; the alkali metal salts of sulfuric acid esters of the reaction product of one mole of a higher fatty alcohol and about 1 to 6 moles of ethylene oxide.

2. Non-ionic synthetic detergents can be broadly described as the condensation product of alkylene oxide groups with an organic hydrophobic compound, which may be aliphatic or alkyl aromatic in nature. There are also non-ionic detergents with semi-polar characteristics. Preferred classes of non-ionic detergents are:
   a. The condensation products of ethylene oxide with a hydrophobic base formed by the condensation of propylene oxide with propylene glycol.
   b. The condensation products of polyethylene oxide with alkyl phenols, the alkyl group of which contains from about 6 to 12 carbon atoms.
   c. The condensation products of ethylene oxide with the reaction product of propylene oxide and ethylene-diamine.
   d. The condensation products of ethylene oxide with aliphatic alcohols having from 8 to 22 carbon atoms.
   e. The ammonia, monoethanol and diethanol amides of fatty acids having an acyl moiety of from about 8 to 18 carbon atoms.
   f. Tertiary amine oxides with a long aliphatic chain such as dimethyllaurylamine oxide.
   g. Tertiary phosphine oxides with a long aliphatic chain such as dimethyllaurylphosphine oxide.
   h. Sulfoxides with a long aliphatic chain such as lauryl methyl sulfoxide.

3. Zwitterionic synthetic detergents can be broadly described as derivatives of aliphatic quaternary ammonium, phosphonium and sulfonium compounds, wherein one of the aliphatic substituents contains an anionic group, such as carboxy, sulfo, sulfato, phosphato or phosphono.

4. Ampholytic synthetic detergents can be broadly described as derivatives of aliphatic secondary and tertiary amines, wherein one of the aliphatic substituents contains an anionic group, such as carboxy, sulfo, sulfato, phosphato or phosphono.

The compounds of the present invention may also be used in detergent compositions together with the usual adjuvants such as carboxymethyl cellulose for increasing the anti-redepositing power, anti-staining agents, fluorescent brightening agents, foaming agents and anti-foaming agents, bleaching agents, sodium carbonate, sodium silicate, fillers, colorants, and perfumes.

In practicing this invention the proportion by weight of detergent to builder may be from about 10:1 to 1:20.

The composition may be in the form of a liquid or a solid. The following examples are presented only for the purpose of illustrating this invention, and are not to be regarded as limiting the scope thereof in any way.

EXAMPLE I

Preparation of dicarboxymethyl starch. Starch in an amount of 162 g. and 366 g. (2 equivalents) of α-bromomalonic acid were thoroughly mixed in a mixing device for thirty minutes. To this was added at a temperature of 40° to 45° C. a solution containing 120 g. (3 moles) sodium hydroxide in water. The mixture was then allowed to stand and digest for five hours and then purified with an aqueous solution of methanol (80% by weight of methanol). The purity of the final product varied of from about 90 up to 96%, depending on the amount of sodium salt of α-hydroxymalonic acid formed during the reaction.

EXAMPLE II

A number of detergents were prepared using the components mentioned in the first column of Table II. The amounts of component used are expressed as wt.%.

TABLE II

| Component | Recipe Number 1 | 2 | 3 | 4 |
| --- | --- | --- | --- | --- |
| Dicarboxy methyl starch | 40 | 40 | 40 | |
| Sodium tripolyphosphate | | | | 30 |
| Sodium disilicate | | | | 6 |
| Sodium metasilicate | 15 | 15 | 15 | |
| Non-Ionic (1) | 12 | | 2 | 2 |
| Na DBS (2) | | | 6 | 4 |
| Soap (3) | | 12 | 4 | 6 |
| Borax | 20 | 20 | 20 | 20 |
| Na$_2$SO$_4$ | 13 | 13 | 13 | 20 |

By Non-ionic (1) is meant tallow fatty alcohol ethoxylate with an average of 25 ethoxy groups and marketed by Servo, and by NaDBS (2), sodium dodecylbenzene sulfonate, and by Soap (3) a sodium soap obtained from a mixture of 86 parts of tallow and 14 parts of palm kernel oil. The mixtures were used in a wash liquor concentration of 4 g/l water with a dH (German Hardness) of 15° and were tested for washing power on a number of pieces of standard cloth by means of a Tergoto meter. These pieces of standard cloth were designed for the detergents industry and are now commercially available. The washing treatment was carried out in a wash liquor containing all the pieces of cloth.

The other test conditions were as follows:

The temperature of the wash liquor was kept at 90° C., the liquor to material ratio was 1/175, the washing time was 15 minutes, and the agitator blade had a speed of 75 revolutions per minute. With the Type 610 photovoltmeter marketed by the Photovolt Corporation, the remission coefficient was determined for each of the washed pieces of material and compared with that of the non-washed piece of cloth. The data thus obtained were used for calculating the total washing results. The redeposition was also determined.

By redeposition is to be understood the difference between the remission coefficients in green light of a white cotton fabric before washing and after two washing treatments in the presence of all the pieces of standard material, the second washing treatment being carried out in the presence of a new series of pieces of standard cloth. This second treatment served to enhance the effect of the first treatment.

The results are listed in the following table:

TABLE III

| Recipes | 1 | 2 | 3 | 4 |
| --- | --- | --- | --- | --- |
| Redeposition | 5 | 4 | 2 | 1 |
| Washing results of Standard pieces of cloth | | | | |
| Vekoprop | 15 | 24 | 23 | 23 |
| Empa Cocoa | 25 | 32 | 31 | 32 |
| Empa Standard | 28 | 31 | 20 | 26 |
| Empa ink/oil | 35 | 32 | 33 | 31 |
| Krefeld | 26 | 19 | 22 | 22 |
| Kwijove | 33 | 35 | 30 | 33 |
| Total washing results | 162 | 173 | 159 | 167 |

The figures in the table are indicative of the favorable results obtained by the builders according to the present invention.

What is claimed is:

1. A water-soluble carboxylated polysaccharide having from 0.5 to 3 hydrogen atoms of the hydroxyl groups per monomeric six carbon glucose unit substituted by etherification with radicals containing at least 2 groups selected from carboxyl and carboxylate.

2. The water-soluble carboxylated polysaccharide of claim 1 wherein said substituted radicals are -CH(COO-)$_2$ groups.

3. The water-soluble carboxylated polysaccharide of claim 1 wherein said substituted radicals are

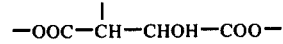

groups.

4. The water-soluble carboxylated polysaccharide of claim 1 wherein said substituted radicals are

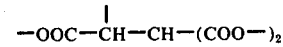

groups.

5. The water-soluble carboxylated polysaccharide of claim 1 wherein said carboxylated polysaccharide is carboxylated starch.

* * * * *